United States Patent
Lindhorst et al.

(10) Patent No.: US 12,327,096 B2
(45) Date of Patent: Jun. 10, 2025

(54) DEFERRED FORMULA COMPUTATION

(71) Applicant: Microsoft Technology Licensing, LLC, Redmond, WA (US)

(72) Inventors: Gregory S. Lindhorst, Seattle, WA (US); Jonathan Michael Stall, Woodinville, WA (US); Shantanu Kiran Pakhare, Redmond, WA (US); Vamsi Modem, Snohomish, WA (US); Lee McCall Saltzman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

(21) Appl. No.: 18/052,263

(22) Filed: Nov. 3, 2022

(65) Prior Publication Data
US 2024/0036840 A1 Feb. 1, 2024

Related U.S. Application Data

(60) Provisional application No. 63/394,114, filed on Aug. 1, 2022.

(51) Int. Cl.
G06F 8/41 (2018.01)
(52) U.S. Cl.
CPC .................................. *G06F 8/433* (2013.01)
(58) Field of Classification Search
CPC ....................................................... G06F 8/433
See application file for complete search history.

(56) References Cited

U.S. PATENT DOCUMENTS 5,819,102 A 10/1998 Reed et al.
8,572,477 B1 10/2013 Moskovitz et al.
(Continued)

FOREIGN PATENT DOCUMENTS

| CN | 105241964 A | 1/2016 |
| CN | 108280515 A | 7/2018 |
| KR | 20130053345 A * | 5/2013 |

OTHER PUBLICATIONS

Ennals, Robert J., "Adaptive Evaluation of Non-Strict Programs", In Technical Report of UCAM-CL-TR-730, ISSN 1476-2986, Aug. 2008, 243 Pages.
(Continued)

*Primary Examiner* — Ziaul A Chowdhury
(74) *Attorney, Agent, or Firm* — Holzer Patel Drennan

(57) ABSTRACT

Deferred formula computation executes software containing a set of programmed formulas, wherein the set includes a first programmed formula defined in an associated dependency graph to be dependent on a result of a second programmed formula. A method may encounter a reference to the first programmed formula during execution of the software, wherein the reference is associated with deferred formula computation request program code in the executing software to obtain a result of the first programmed formula; identify during execution of the software the second programmed formula based on traversal within the associated dependency graph of the first programmed formula; compute a result of the second programmed formula during execution of the software; compute the result of the first programmed formula during execution of the software, and return the computed result of the first programmed formula in association with the reference to the first programmed formula.

20 Claims, 5 Drawing Sheets

(56) References Cited

U.S. PATENT DOCUMENTS

| | | | |
|---|---|---|---|
| 10,387,210 B2 | 8/2019 | Valecha et al. | |
| 10,482,263 B2 | 11/2019 | Antonopoulos et al. | |
| 10,901,715 B1 | 1/2021 | Raiman | |
| 10,924,559 B1* | 2/2021 | Kubik | H04L 12/1421 |
| 11,294,767 B2 | 4/2022 | Palmer | |
| 2005/0251664 A1* | 11/2005 | Caprioli | G06F 9/3834 |
| | | | 712/228 |
| 2009/0300338 A1* | 12/2009 | Caprioli | G06F 9/3842 |
| | | | 712/228 |
| 2019/0121716 A1* | 4/2019 | Kurmus | G06F 21/00 |
| 2022/0391101 A1* | 12/2022 | Eyole | G06F 9/38585 |

OTHER PUBLICATIONS

Faxen, Karl-Filip, "Cheap Eagerness: Speculative Evaluation in a Lazy Functional Language", In Proceedings of the Fifth ACM SIGPLAN International Conference on Functional Programming, Sep. 1, 2000, pp. 150-161.

Lindhorst, Greg, "Power Fx: Open Source Now Available", Retrieved from: https://powerapps.microsoft.com/en-us/blog/power-fx-open-source-now-available/, Nov. 2, 2021, 17 Pages.

Krishnav, "Code re-usability in PowerApps using User-Defined functions", Retrieved from: https://powerusers.microsoft.com/t5/Power-Apps-Community-Blog/Code-re-usability-in-PowerApps-using-User-Defined-functions/ba-p/672998, Aug. 30, 2020, 6 Pages.

Wlaschin, Scott, "Immutability", Retrieved from: https://fsharpforfunandprofit.com/posts/correctness-immutability/, Apr. 19, 2012, 12 pages.

"Incremental Computing", Retrieved From: https://en.wikipedia.org/w/index.php?title=Incremental_computing&oldid=1040652126, Aug. 25, 2021, 5 Pages.

"International Search Report and Written Opinion Issued in PCT Application No. PCT/US23/027442", Mailed Date: Oct. 23, 2023, 15 Pages.

\* cited by examiner

DEFERRED FORMULA COMPUTATION

CROSS-REFERENCE TO RELATED APPLICATIONS

The present application claims benefit for priority to U.S. Provisional Patent Application No. 63/394,114, entitled "Deferred Formula Computation" and filed on Aug. 1, 2022, which is specifically incorporated by reference herein for all that it discloses and teaches.

BACKGROUND

When launching a software application, the software application may perform various computations during the launch phase, which can slow the user experience awaiting completion of such computations (e.g., calculating the result of a formula). For example, an application may access a database to compute certain global variables at launch using imperative logic, such as computing user interface parameters for a video display component of the application (e.g., the size of a video player window to be presented in a mobile device). In some applications, these computations (or at least the number of such computations) are resource and time intensive, and many of the computations are never needed by the user after launch (e.g., the user never executes the video player functionality).

SUMMARY

In some aspects, the techniques described herein relate to a method including: executing software containing a set of programmed formulas, wherein the set includes a first programmed formula defined in an associated dependency graph to be dependent on a result of a second programmed formula; encountering a reference to the first programmed formula during execution of the software, wherein the reference is associated with deferred formula computation request program code in the executing software to obtain a result of the first programmed formula; identifying during execution of the software the second programmed formula based on traversal within the associated dependency graph of the first programmed formula; computing a result of the second programmed formula during execution of the software, based on the identifying; computing the result of the first programmed formula during execution of the software, based on computing the result of the second programmed formula; and returning the computed result of the first programmed formula in association with the reference to the first programmed formula during execution of the software.

In some aspects, the techniques described herein relate to a computing system including: one or more hardware processors configured to execute software containing a programmed formula; and deferred formula computation request program code associated with a reference to the programmed formula in the software, wherein the deferred formula computation request program code is executed by the one or more hardware processors to obtain a result of the programmed formula during run-time in the software, based on encountering the reference during run-time in the software, wherein the deferred formula computation request program code is further configured to determine that the result of the programmed formula has not been computed during run-time in the software, to cause computation of the result of the programmed formula during run-time in the software, based on the determination, and returning the computed result of the programmed formula in association with the reference to the programmed formula during run-time in the software.

In some aspects, the techniques described herein relate to one or more tangible processor-readable storage media embodied with instructions for executing on one or more processors and circuits of a computing device a process, the process including: executing software containing a set of programmed formulas, wherein the set includes a first programmed formula defined in an associated dependency graph to be dependent on a result of a second programmed formula; encountering a reference to the first programmed formula during execution of the software, wherein the reference is associated with deferred formula computation request program code in the executing software to obtain a result of the first programmed formula; identifying during execution of the software the second programmed formula based on traversal within the associated dependency graph of the first programmed formula; computing the result of the second programmed formula during execution of the software, based on the identifying; computing the result of the first programmed formula during execution of the software, based on computing the result of the second programmed formula; and returning the computed result of the first programmed formula in association with the reference to the first programmed formula during execution of the software.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
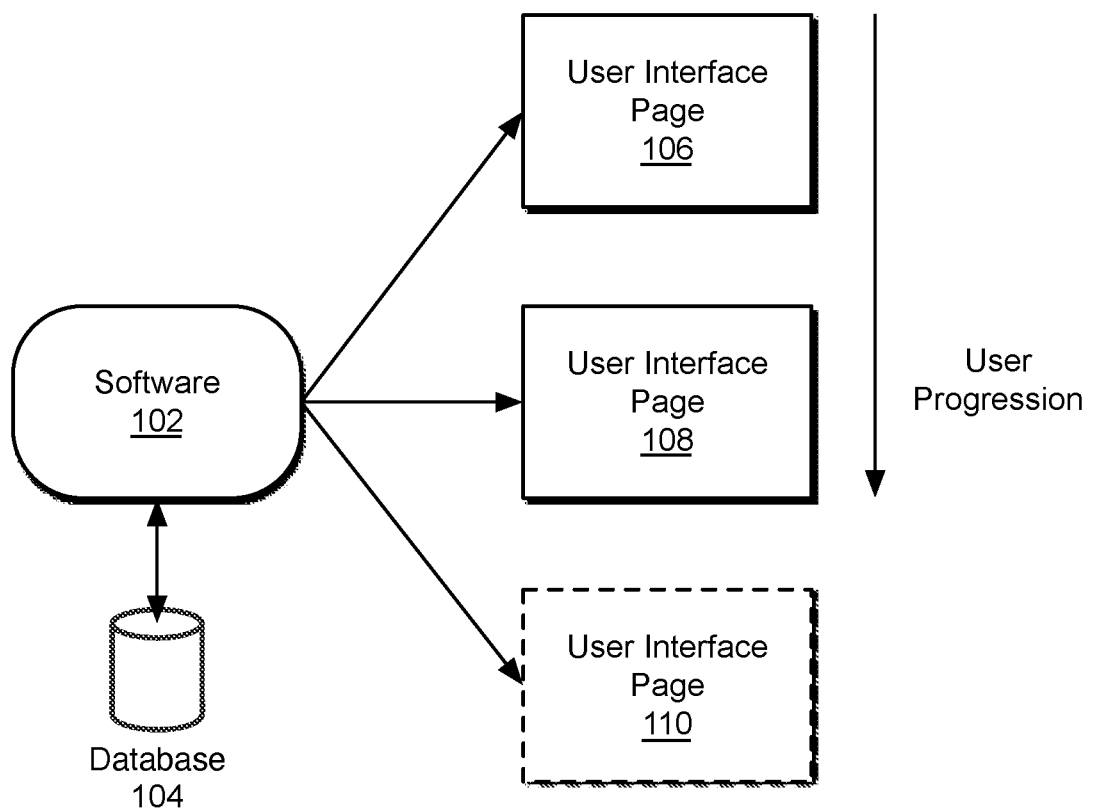
FIG. 1 illustrates example deferred formula computation in a software execution environment.

The described technology provides for deferred formula computation functionality for programmers of software applications. Programmers and users can both benefit from the deferred formula computation functionality because it can speed up software program launches (e.g., before the user has access to the software's user interface) and reduce data retrieval and computational resource until and unless formula computation is called for as part of the user's interaction with the software.

In computer science, a procedural program, making use of imperative programming, is modeled as a series of operations happening in a specific order and may be as sequential and subject to control flow (indicating that the program chooses a specific path). Procedural programming is a type of imperative programming in which the program is built from one or more procedures (also termed subroutines or functions) in some specified sequence with appropriate control flow. The program focuses on commands, in line with the von Neumann vision of sequential programming, where data is normally "at rest." In contrast, dataflow programming emphasizes the movement of data and models programs as a series of connections. Declarative programming (a type of non-imperative programming) is compatible with dataflow programming in many ways. Explicitly defined inputs and outputs connect operations, which function like black boxes. An operation executes as soon as all of its inputs become valid. Thus, dataflow languages are inherently parallel and can work well in large, decentralized systems.

Accordingly, imperative programming is a programming paradigm of software that uses statements that change a program's state. In contrast, in declarative programming, the logic of a computation is expressed without describing its control flow. Programmed formulas describe a desired value based on dependencies rather than defining procedurally how and when to compute the result value. In addition, the computation of a programmed formula, as used by the described technology, is based on component dependencies, much as it does in the mathematical sense. The dependencies could be records in a database, data from a user interface, other programmed formulas, or any other input. Furthermore, it should be understood that a programmed formula is time-invariant, but the result of the programmed formula may change over time as the results of component formulas and/or input data change.

As an example of statements in imperative programming versus programmed formulas in declarative programming, the following is provided:

Where a programmer sets an statement in imperative programming (e.g., in App.OnStart):

Set(X, 4) // sets X to 4 once, at the time this statement is executed, and X can vary from the original 4 unexpectedly thereafter Where a programmer defines a programmed formula (e.g., in App.Formulas):

X=4 // defines X as 4, for all time. There is no time in which this formula is not held true, so its truth does not matter when an implementation executes it or if it ever executes it.

In deferred formula computation, a programmed formula calculation is established for the execution lifetime of the software program. Unlike setting a global variable via imperative programming at a specific point in run-time execution (e.g., at launch or OnStart), a programmed formula specifies a relationship defining how a result can be computed. Accordingly, the described technology enables deferred computation of such formula (e.g., deferring computation of the formula until execution of the program has need of the computation result, such as when a user executes specific functionality that requires the result).

Furthermore, a programmed formula may have component formulas and values on which it depends. Accordingly, as the results of component formulas and the component values (e.g., input data) change, data flow programming may indicate that the result of the programmed formula should be re-computed. However, deferred formula computation can further defer this re-computation until a user executes specific functionality that requires the updated result.

FIG. 1 illustrates example deferred formula computation in a software execution environment 100. A software program (software 102) performs a designed functionality that accesses data in a database 104 and presents a user with three different user interface pages (user interface page 106, user interface page 108, and user interface page 110), such as in a display screen, in an order indicated by the arrow labeled "user progression." For example, a user may initially be presented with the user interface page 106, and then, by virtue of the user's interaction with the software 102, the user will be presented with the user interface page 108. In this example, the user does not progress to the user interface page 110 and instead terminates the execution of the software 102.

This example illustrates a problem addressed by the described technology. Many computations may be performed when the software 102 is initially launched. In some implementations, these initial launch computations are programmed into an OnStart portion of the launch process because they are attributed with the OnStart property. The OnStart property specifies that the code is to run when the user launches the software 102. This property is often used to perform the following tasks:

Retrieve and cache data into collections by using a Collect function.

Set up global variables by using a Set function.

Accordingly, imperative programming attributed with the OnStart property is executed, and the data on which the same programming depends are retrieved/cached before the first screen appears. In particular, retrieval/caching of such data can be time and resource intensive. No screen is loaded during OnStart execution, so the user is waiting for the user interface to become accessible. As such, the computation of a large volume of imperatively programmed statements or SET operations and the retrieval/cache of associated data at launch can impair the user experience because the user is awaiting access to the user interface while the OnStart operations are completed.

This impairment is particularly frustrating because, depending on how the user uses the software, many of the imperative result computations may never actually be needed during run-time of the software 102. As illustrated in FIG. 1, the user does not even access the user interface page 110 during the execution session. As such, some results computation and data retrieval/caching for the user interface page 110 are wasted activities. Accordingly, the described technology enables deferring the computation by writing the logic as a time-invariant programmed formula, instead of as imperative steps that must be performed at a particular time, deferring data retrieval/caching for the user interface page 110 until the run-time execution of the software 102 encounters a reference to the formulas in the program code that presents the user interface page 110. In FIG. 1, the user does not access the user interface page 110, so the corresponding formula computation and data retrieval/caching are not performed. Likewise, the formula computation and data retrieval/caching for the user interface page 106 and user interface page 108 are also deferred until each page is presented. Accordingly, the user experience during the launch sequence is faster and less frustrating.

Figure 2:
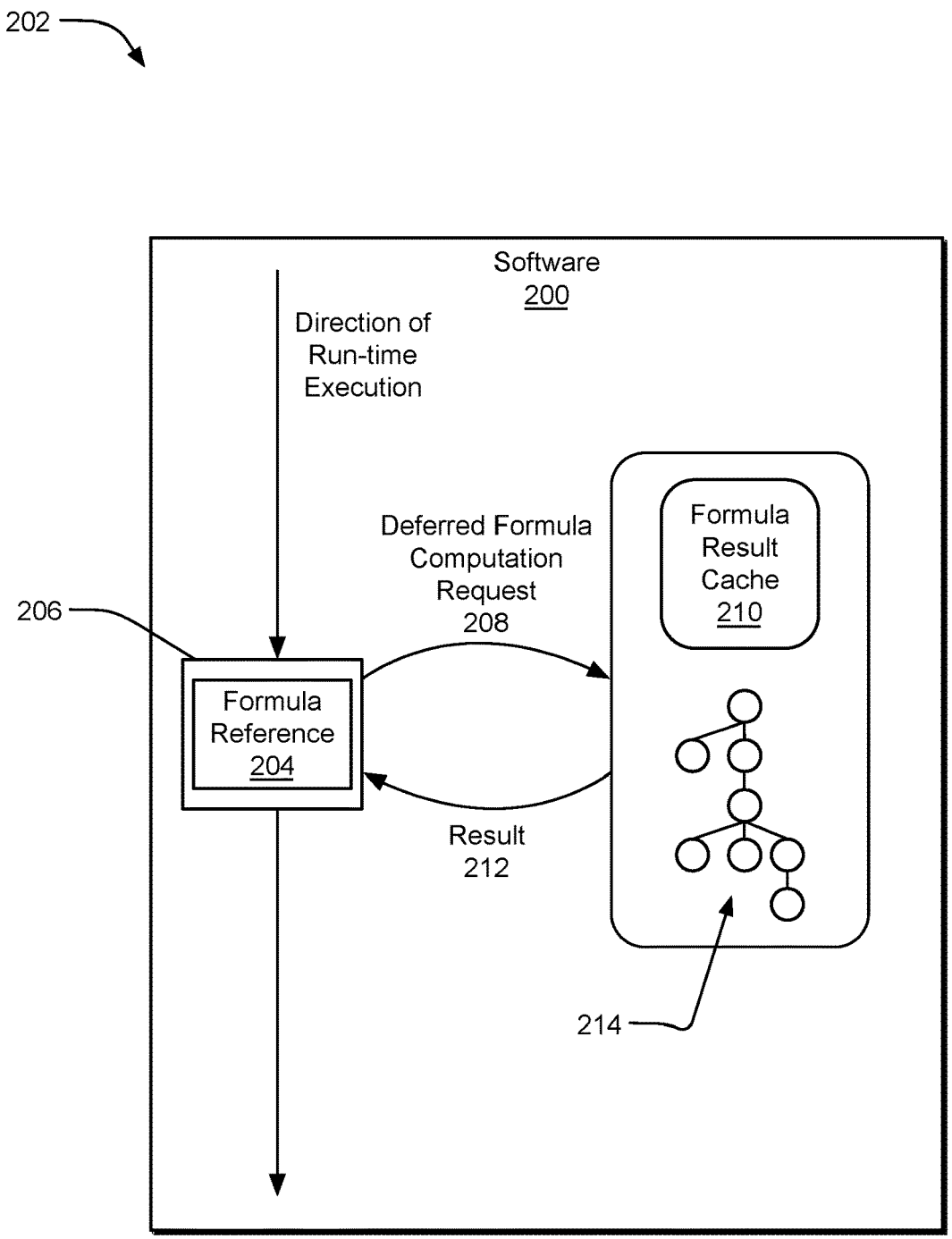
FIG. 2 illustrates software executing example deferred formula computation in a software execution environment.

FIG. 2 illustrates software 200 executing example deferred formula computation in a software execution environment 202. In FIG. 2, the software includes a reference to a formula (a formula reference 204). In one example, the formula is used to compute the dimensions of a form field in a page of a mobile application, which may include retrieving database records to fill the field, resizing the field to display correctly on the screen of the mobile device, etc. Rather than coding this computation as imperative logic that must be performed during the launch sequence, the programmer defines this computation as a time-invariant "named formula," which caused the compiler to add deferred formula computation request program code 206 at compile-time to defer computation of the named formula until it is needed. The compiler, for example, can add deferred formula computation request program code 206 to trigger a call (a deferred formula computation request 208 in the run-time execution) from the call site to request deferred formula execution of the referenced formula.

In one implementation, the deferred formula execution request checks a formula result cache 210 to determine whether the result of the referenced formula has already been computed (e.g., calculated). Note: The formula reference 204 may have already been encountered in an earlier portion of the run-time execution (e.g., for a user interface page already accessed by the user after launch). As such, it may not be necessary to re-compute the result—if the result associated with the formula reference 204 is in the cache and not stale, then the result can be returned to the call site from the formula result cache 210.

In some implementations, a referenced formula may have one or more component dependencies, including data that may need to be retrieved or updated from a database and component formulas that are to be computed or updated before the referenced formula can be computed. In such cases, even if the result of the referenced formula is stored in the formula result cache 210, it may be stale (e.g., no longer valid). As such, the deferred formula computation request 208 (and/or the requested program code that it invokes) can analyze a dependency graph 214 associated with the referenced formula to identify these data and component dependencies, retrieve and/or update the needed data and formula results, and complete the up-to-date computation of the referenced formula. A result 212 of this up-to-date deferred computation is returned to the call site in the run-time execution flow.

In at least one implementation, the dependency graph 214 provides the relationships among programmed formulas and their component programmed formulas and other data that constitute elements of the programmed formula and its components, if any. For example, if a first programmed formula depends on a second programmed formula, this dependency is indicated in the dependency graph. Likewise, if a first programmed formula depends on an element of data (e.g., a record in a database), this dependency is indicated in the dependency graph. As such, the executing software traverses the dependency graph to recursively identify the dependencies (e.g., identities of component data and component programmed formulas) such that the dependencies (e.g., data and formulas) that are lower in the graph can be resolved (e.g., updated/computed) before the parent nodes are resolved, and so on, up through the dependency graph to the first programmed formula (e.g., at the top of the dependency tree).

To further illustrate the described technology, snippets of program code are provided below with some description. In Code Sample 1 (below), a named formula "colNav" is defined:

Code Sample 1

```
colNav =
  ForAll(
    Sort(
      Filter(
        Apps,
        'Hide App from Menu' = 'Hide App from Menu (Apps)'.No
      )
      , msft_appdisplayrank, Ascending),
```

Code Sample 1 -continued

```
      {
        DisplayName: msft_displayname,
        Image: msft_appiconurl,
        AppName: msft_appname,
        Screen: If(
          msft_appname = ThisAppName,
          ThisAppStartScreen
        ),
        PowerAppID: msft_powerappid,
        TrackingLevel: msft_trackinglevel
      }
    );
```

In Code Sample 2 (below), the named formula "colNav" is referenced twice in a script for an AppSwitcher component, which is executed during run-time. When the AppSwitcher component is compiled, the compiler inserts deferred formula computation request program code in association with each named formula reference (in bold) to issue a deferred formula computation request 208 during run-time, which evaluates the formula result cache 210 and/or the dependency graph 214 to retrieve the result 212.

Code Sample 2

```
/////////////
/* BEGIN: Scripts for AppSwitcher Component */
/////////////
ThisAppName = "Emergency Response App - Staffing";
///// Change ThisAppStartScreen to the app main screen
ThisAppStartScreen = StaffBedCountsScreen;
ThisAppDisplayName = LookUp(colNav, AppName = ThisAppName,
DisplayName); varTrackingLevel = LookUp(colNav, DisplayName =
ThisAppDisplayName, TrackingLevel);
ParamFacility =
  If(
    Not IsBlank(Param("FacilityID")),
    LookUp(
      Facilities,
      Id = GUID(Param("FacilityID"))
    ).Name
  )
);
```

In one implementation, the first reference to the named formula "colNav" (in the line starting with "ThisAppStartScreen") may be the first time the reference to the named formula has been encountered during run-time. As such, the program code added during compile-time requests the result of the named formula, which may involve examining the formula result cache 210 and/or dependency graph 214. If the formula result cache 210 contains an up-to-date result for the named formula, the result 212 is returned to the call site. If not, the result 212 is computed or updated, stored in the formula result cache 210, and returned to the call site. At the second reference, the same operations are triggered so that the result computation is evaluated again, potentially just returning the result 212 from the formula result cache 210. As such, the program code can perform the same or similar checks to confirm the cached result is up-to-date before returning the result 212.

Figure 3:
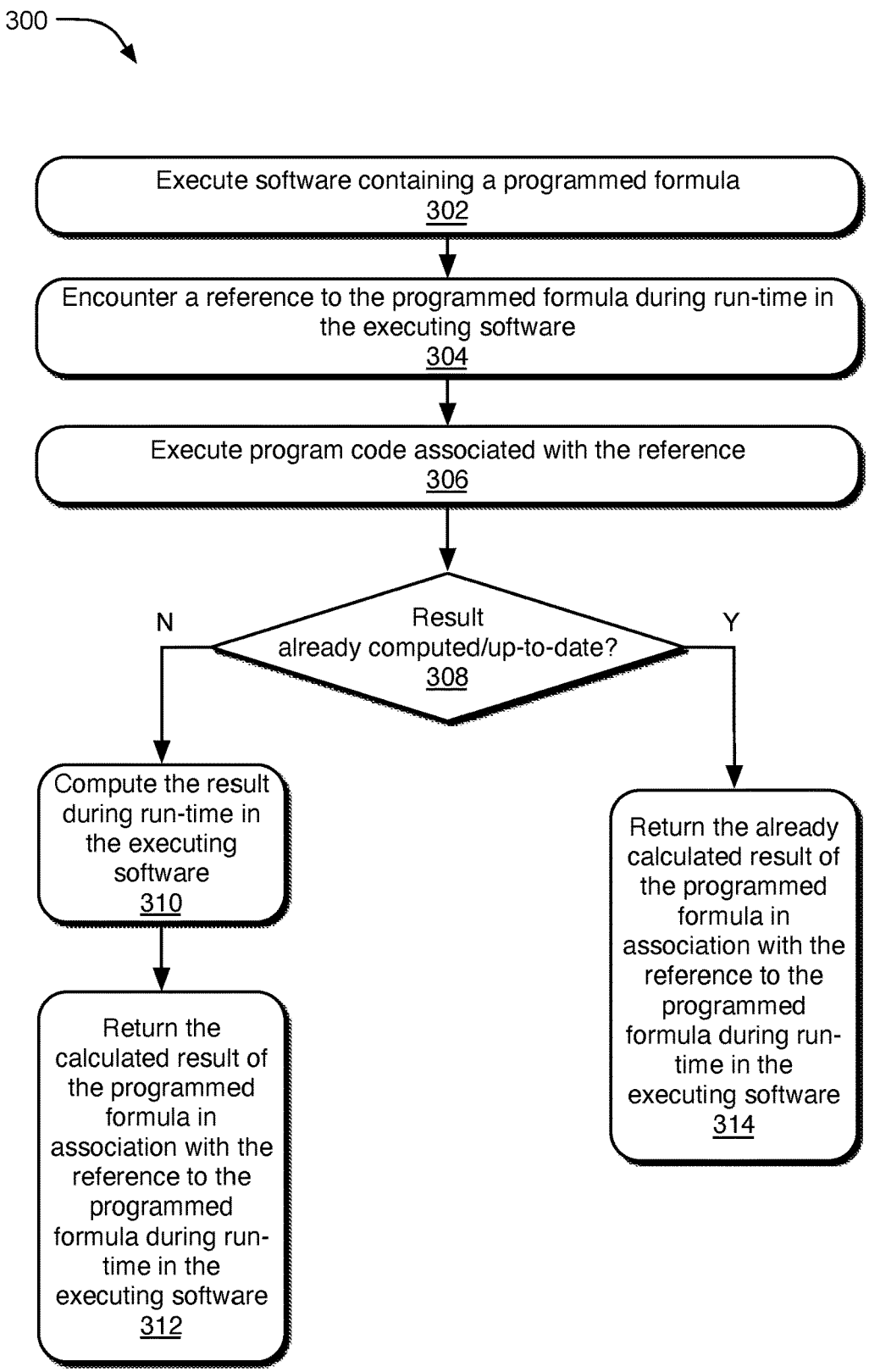
FIG. 3 illustrates example operations providing deferred formula computation in a software execution environment.

FIG. 3 illustrates example operations 300 providing deferred formula computation in a software execution environment. A launch operation 302, during run-time, executes software containing a programmed formula. A trigger operation 304 encounters a reference to the programmed formula during run-time in the executing software. The reference is associated with deferred formula computation request program code in the executing software to obtain a result of the programmed formula. A request operation 306 executes the deferred formula computation request program code based on encountering the reference during run-time in the executing software. In one implementation, the deferred formula computation request program code is added to the software during compile time, although such program code may be added in an interpreted or non-compiled code execution environment as well.

A decision block 308 determines from the executing program code whether the result of the programmed formula has been computed and is up-to-date during run-time in the executing software. In one implementation, the already-computed result is stored in a formula result cache, although other storage destinations may be employed. If the result of the programmed formula has already been computed (and its dependencies are up-to-date), the already-computed results are returned to the call site in the run-time execution in a return operation 314. If the result of the programmed formula has not already been computed (or its dependencies are up-to-date), a deferred computation operation 310 computes the result of the referenced formula. The deferred computation operation 310 may retrieve/update component data and/or compute/update component formulas of the referenced formula, such as by consulting a dependency graph associated with the referenced formula. Another return operation 312 returns the newly computer/updated result to the call site in the run-time execution.

Figure 4:
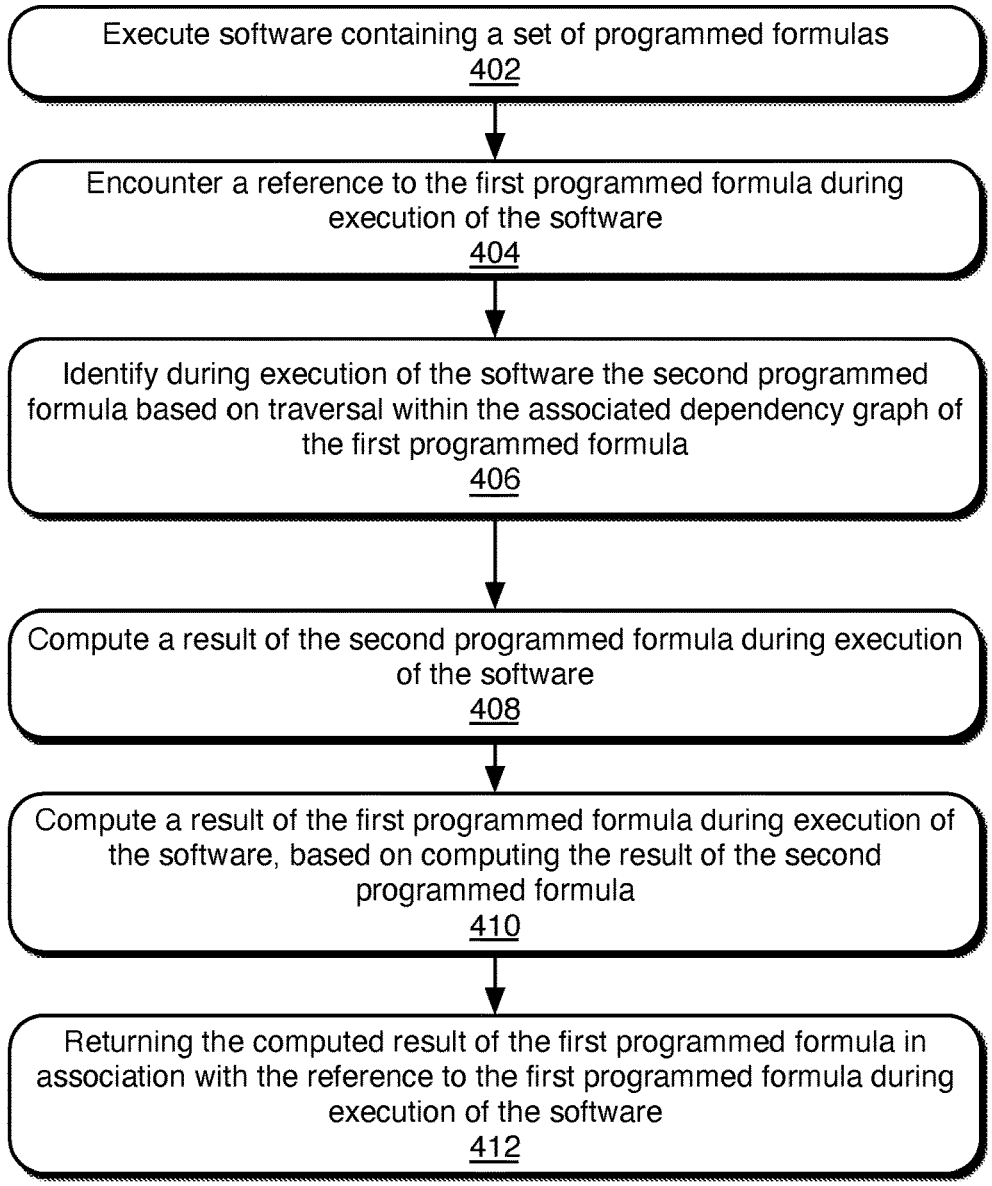
FIG. 4 illustrates alternative example operations providing deferred formula computation in a software execution environment.

FIG. 4 illustrates alternative example operations 400 providing deferred formula computation in a software execution environment. An execution operation 402 executes software containing a set of programmed formulas, wherein the set includes a first programmed formula defined in an associated dependency graph to be dependent on a result of a second programmed formula. A reference operation 404 encounters a reference to the first programmed formula during the execution of the software, wherein the reference is associated with deferred formula computation request program code in the executing software to obtain a result of the first programmed formula. An identification operation 406 identifies during the execution of the software the second programmed formula based on traversal within the associated dependency graph of the first programmed formula. A computing operation 408 computes a result of the second programmed formula during the execution of the software, based on the identification operation 406. Another computing operation 410 computes a result of the first programmed formula during the execution of the software, based on computing the result of the second programmed formula. A result operation 412 returns the computed result of the first programmed formula in association with the reference to the first programmed formula during the execution of the software.

Figure 5:
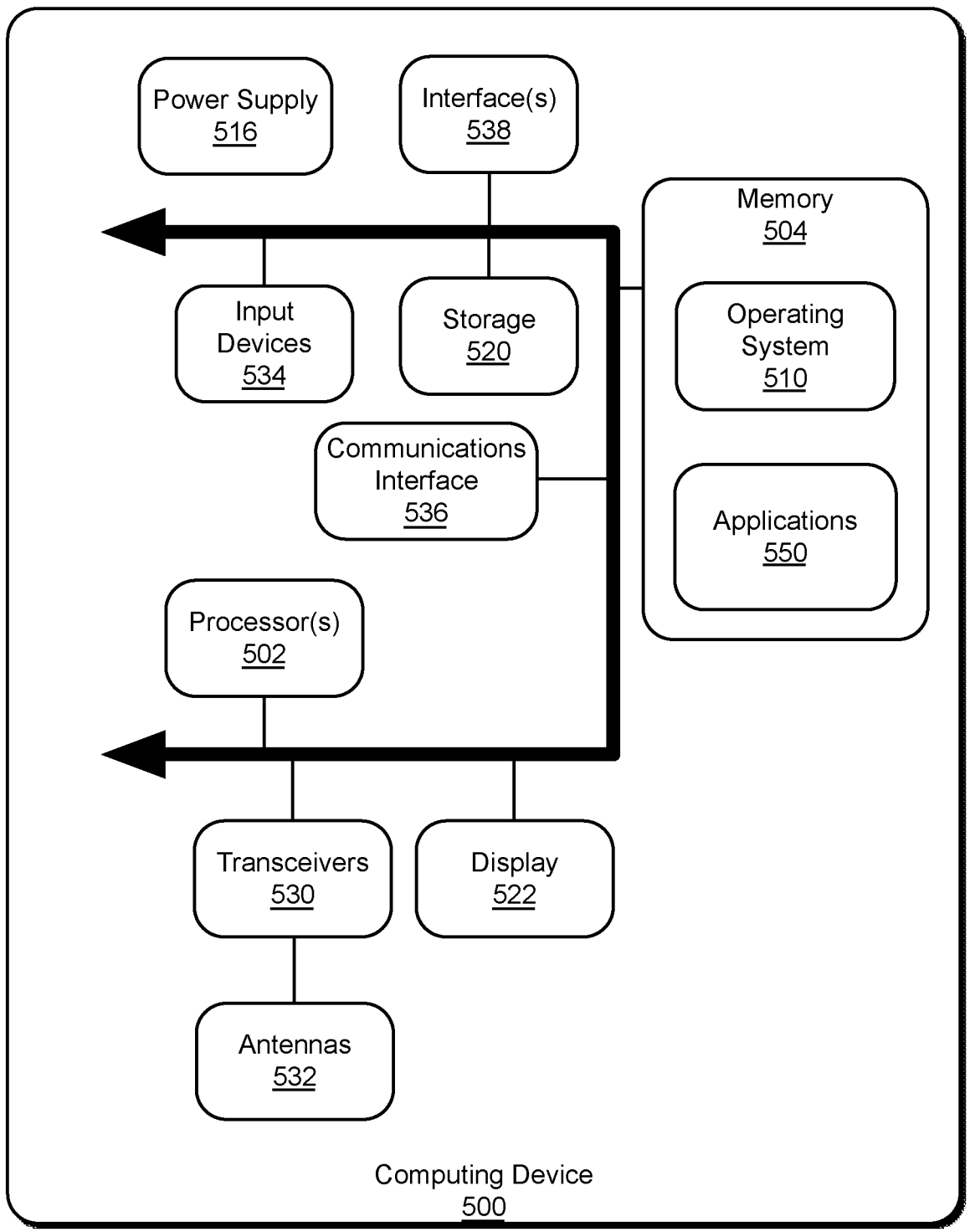
FIG. 5 illustrates an example computing device for use in deferred formula computation.

FIG. 5 illustrates an example computing device for use in deferred formula computation. The computing device 500 may be a client device, such as a laptop, mobile device, desktop, tablet, or a server/cloud device. The computing device 500 includes one or more processor(s) 502, and a memory 504. The memory 504 generally includes both volatile memory (e.g., RAM) and nonvolatile memory (e.g., flash memory). An operating system 510 resides in the memory 504 and is executed by the processor(s) 502.

In an example computing device 500, as shown in FIG. 5, one or more modules or segments, such as applications 550, deferred formula computation request program code, and other program code and modules are loaded into the operating system 510 on the memory 504 and/or storage 520 and executed by processor(s) 502. The storage 520 may store deferred formula computation request program code and other program code, a dependency graph, a formula result cache, database contents, and other data and be local to the computing device 500 or may be remote and communicatively connected to the computing device 500. In particular, in one implementation, components of the deferred formula computation may be implemented entirely in hardware or in a combination of hardware circuitry and software.

The computing device 500 includes a power supply 516, which is powered by one or more batteries or other power sources, and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a communications interface 536 (such as a network adapter or an I/O port, which are types of communication devices). The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touchscreen display.

The computing device 500 may include a variety of tangible processor-readable storage media and intangible processor-readable communication signals. Tangible processor-readable storage can be embodied by any available media that can be accessed by the computing device 500 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method comprising: executing software containing a set of programmed formulas, wherein the set includes a first programmed formula defined in an associated dependency graph to be dependent on a result of a second programmed formula; encountering a reference to the first programmed formula during execution of the software, wherein the reference is associated with deferred formula computation request program code in the executing software to obtain a result of the first programmed formula; identifying during execution of the software the second programmed formula based on traversal within the associated dependency graph of the first programmed formula; computing a result of the second programmed formula during execution of the software, based on the identifying; computing the result of the first programmed formula during execution of the software, based on computing the result of the second programmed formula; and returning the computed result of the first programmed formula in association with the reference to the first programmed formula during execution of the software.

Clause 2. The method of any preceding method clause, wherein the deferred formula computation request program code associated with the reference is inserted into the software at compile-time, based on encountering the reference to the first programmed formula during compile-time.

Clause 3. The method of any preceding method clause, further comprising: executing the deferred formula computation request program code, based on encountering the reference during the execution of the software, wherein execution of the deferred formula computation request program code determines whether the result of the first programmed formula has been computed during the execution of the software.

Clause 4. The method of any preceding method clause, wherein the identifying operation examines the associated dependency graph that indicates components of the first programmed formula, determines that the indicated components are up-to-date, and computes the result of the first programmed formula.

Clause 5. The method of any preceding method clause, wherein the identifying operation examines the associated dependency graph that indicates components of the first programmed formula, determines that one or more of indicated components are not up-to-date, updates the one or more of the indicated components, and computes the result of the first programmed formula based on the indicated components and on the updating.

Clause 6. The method of any preceding method clause, further comprising: executing the deferred formula computation request program code, based on encountering the reference during the execution of the software, wherein execution of the deferred formula computation request program code triggers the traversal within the associated dependency graph of the first programmed formula.

Clause 7. The method of any preceding method clause, further comprising: executing the deferred formula computation request program code associated with the reference to determine that the result of the second programmed formula has not been computed during the execution of the software.

Clause 8. A computing system comprising: one or more hardware processors configured to execute software containing a programmed formula; and deferred formula computation request program code associated with a reference to the programmed formula in the software, wherein the deferred formula computation request program code is executed by the one or more hardware processors to obtain a result of the programmed formula during run-time in the software, based on encountering the reference during run-time in the software, wherein the deferred formula computation request program code is further configured to determine that the result of the programmed formula has not been computed during run-time in the software, to cause computation of the result of the programmed formula during run-time in the software, based on the determination, and returning the computed result of the programmed formula in association with the reference to the programmed formula during run-time in the software.

Clause 9. The computing system of any preceding computing system clause, wherein the deferred formula computation request program code associated with the reference is inserted into the software at compile-time, based on encountering the reference to the programmed formula during compile-time.

Clause 10. The computing system of any preceding computing system clause, wherein the deferred formula computation request program code determines whether the result of the programmed formula has been computed during run-time in the software.

Clause 11. The computing system of any preceding computing system clause, wherein the deferred formula computation request program code examines a dependency graph that indicates components of the programmed formula, determines that the indicated components are up-to-date, and computes the result of the programmed formula.

Clause 12. The computing system of any preceding computing system clause, wherein the deferred formula computation request program code examines a dependency graph that indicates components of the programmed formula, determines that one or more of the indicated components are not up-to-date, updates the one or more of the indicated components, and computes the result of the programmed formula based on the indicated components and on the updating.

Clause 13. The computing system of any preceding computing system clause, wherein the indicated components include input data.

Clause 14. The computing system of any preceding computing system clause, wherein the indicated components include other formulas.

Clause 15. One or more tangible processor-readable storage media embodied with instructions for executing on one or more processors and circuits of a computing device a process, the process comprising: executing software containing a set of programmed formulas, wherein the set includes a first programmed formula defined in an associated dependency graph to be dependent on a result of a second programmed formula; encountering a reference to the first programmed formula during execution of the software, wherein the reference is associated with deferred formula computation request program code in the executing software to obtain a result of the first programmed formula; identifying during execution of the software the second programmed formula based on traversal within the associated dependency graph of the first programmed formula; computing the result of the second programmed formula during execution of the software, based on the identifying; computing the result of the first programmed formula during execution of the software, based on computing the result of the second programmed formula; and returning the computed result of the first programmed formula in association with the reference to the first programmed formula during execution of the software.

Clause 16. The one or more tangible processor-readable storage media of any preceding media clause, wherein the deferred formula computation request program code associated with the reference is inserted into the software at compile-time, based on encountering the reference to the first programmed formula during compile-time.

Clause 17. The one or more tangible processor-readable storage media of any preceding media clause, wherein executing the deferred formula computation request program code determines whether the result of the first programmed formula has been computed during the execution of the software.

Clause 18. The one or more tangible processor-readable storage media of any preceding media clause, wherein the identifying operation examines the associated dependency graph that indicates components of the first programmed formula, determines that the indicated components are up-to-date, and compute the result of the first programmed formula.

Clause 19. The one or more tangible processor-readable storage media of any preceding media clause, wherein the identifying operation examines the associated dependency graph that indicates components of the first programmed formula, determines that one or more of the indicated components are not up-to-date, updates the one or more of the indicated components, and computes the result of the first programmed formula based on the indicated components and on the updating.

Clause 20. The one or more tangible processor-readable storage media of any preceding media clause, wherein the indicated components include input data or other programmed formulas.

Clause 21. A system comprising: means for executing software containing a set of programmed formulas, wherein the set includes a first programmed formula defined in an associated dependency graph to be dependent on a result of a second programmed formula; means for encountering a reference to the first programmed formula during execution of the software, wherein the reference is associated with deferred formula computation request program code in the executing software to obtain a result of the first programmed formula; means for identifying during execution of the software the second programmed formula based on traversal within the associated dependency graph of the first programmed formula; means for computing a result of the second programmed formula during execution of the software, based on the identifying; means for computing the result of the first programmed formula during execution of the software, based on computing the result of the second programmed formula; and means for returning the computed result of the first programmed formula in association with the reference to the first programmed formula during execution of the software.

Clause 22. The system of any preceding system clause, wherein the deferred formula computation request program code associated with the reference is inserted into the software at compile-time, based on encountering the reference to the first programmed formula during compile-time.

Clause 23. The system of any preceding system clause, further comprising: means for executing the deferred formula computation request program code, based on encountering the reference during the execution of the software, wherein execution of the deferred formula computation request program code determines whether the result of the first programmed formula has been computed during the execution of the software.

Clause 24. The system of any preceding system clause, wherein the means for identifying examines the associated dependency graph that indicates components of the first programmed formula, determines that the indicated components are up-to-date, and computes the result of the first programmed formula.

Clause 25. The system of any preceding system clause, wherein the means for identifying examines the associated dependency graph that indicates components of the first programmed formula, determines that one or more of indicated components are not up-to-date, updates the one or more of the indicated components, and computes the result of the first programmed formula based on the indicated components and on the updating.

Clause 26. The system of any preceding system clause, further comprising: means for executing the deferred formula computation request program code, based on encountering the reference during the execution of the software, wherein execution of the deferred formula computation request program code triggers the traversal within the associated dependency graph of the first programmed formula.

Clause 27. The system of any preceding system clause, further comprising: means for executing the deferred formula computation request program code associated with the reference to determine that the result of the second programmed formula has not been computed during the execution of the software.

Some implementations may comprise an article of manufacture. An article of manufacture may comprise a tangible storage medium to store logic. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method comprising:
    executing software containing a set of programmed formulas according to a declarative programming scheme, wherein the set includes a first programmed formula defined in an associated dependency graph to be dependent on a result of a second programmed formula;
    encountering a reference to the first programmed formula during execution of the software, wherein the reference is associated with deferred formula computation request program code in the executing software to obtain a result of the first programmed formula;
    identifying during execution of the software the second programmed formula based on traversal within the associated dependency graph of the first programmed formula;
    computing a result of the second programmed formula during execution of the software, based on the identifying;
    computing the result of the first programmed formula during execution of the software, based on computing the result of the second programmed formula; and
    returning the computed result of the first programmed formula in association with the reference to the first programmed formula during execution of the software.

2. The method of claim 1, wherein the deferred formula computation request program code associated with the reference is inserted into the software at compile-time, based on encountering the reference to the first programmed formula during compile-time.

3. The method of claim 1, further comprising:
    executing the deferred formula computation request program code, based on encountering the reference during the execution of the software, wherein execution of the deferred formula computation request program code determines whether the result of the first programmed formula has been computed during execution of the software.

4. The method of claim 1, wherein the identifying operation examines the associated dependency graph that indicates components of the first programmed formula, determines that the indicated components are up-to-date, and computes the result of the first programmed formula.

5. The method of claim 1, wherein the identifying operation examines the associated dependency graph that indicates components of the first programmed formula, determines that one or more of indicated components are not up-to-date, updates the one or more of the indicated components, and computes the result of the first programmed formula based on the indicated components and on the updating.

6. The method of claim 1, further comprising:
    executing the deferred formula computation request program code, based on encountering the reference during the execution of the software, wherein execution of the deferred formula computation request program code triggers the traversal within the associated dependency graph of the first programmed formula.

7. The method of claim 1, further comprising:
    executing the deferred formula computation request program code associated with the reference to determine that the result of the second programmed formula has not been computed during execution of the software.

8. A computing system comprising:
    one or more hardware processors configured to execute software containing a programmed formula according to a declarative programming scheme; and
    deferred formula computation request program code associated with a reference to the programmed formula in the software, wherein the deferred formula computation request program code is executed by the one or more hardware processors to obtain a result of the programmed formula during run-time in the software, based on encountering the reference during run-time in the software, wherein the deferred formula computation request program code is further configured to determine that the result of the programmed formula has not been computed during run-time in the software, to cause computation of the result of the programmed formula during run-time in the software, based on the determination, and returning the computed result of the programmed formula in association with the reference to the programmed formula during run-time in the software.

9. The computing system of claim 8, wherein the deferred formula computation request program code associated with the reference is inserted into the software at compile-time, based on encountering the reference to the programmed formula during compile-time.

10. The computing system of claim 8, wherein the deferred formula computation request program code determines whether the result of the programmed formula has been computed during run-time in the software.

11. The computing system of claim 8, wherein the deferred formula computation request program code examines a dependency graph that indicates components of the programmed formula, determines that the indicated components are up-to-date, and computes the result of the programmed formula.

12. The computing system of claim 8, wherein the deferred formula computation request program code examines a dependency graph that indicates components of the programmed formula, determines that one or more of the indicated components are not up-to-date, updates the one or more of the indicated components, and computes the result of the programmed formula based on the indicated components and on the updating.

13. The computing system of claim 12, wherein the indicated components include input data.

14. The computing system of claim 12, wherein the indicated components include other formulas.

15. One or more tangible processor-readable storage media embodied with instructions for executing on one or more processors and circuits of a computing device a process, the process comprising:
   executing software containing a set of programmed formulas according to a declarative programming scheme, wherein the set includes a first programmed formula defined in an associated dependency graph to be dependent on a result of a second programmed formula;
   encountering a reference to the first programmed formula during execution of the software, wherein the reference is associated with deferred formula computation request program code in the executing software to obtain a result of the first programmed formula;
   identifying during execution of the software the second programmed formula based on traversal within the associated dependency graph of the first programmed formula;
   computing the result of the second programmed formula during execution of the software, based on the identifying;
   computing the result of the first programmed formula during execution of the software, based on computing the result of the second programmed formula; and
   returning the computed result of the first programmed formula in association with the reference to the first programmed formula during execution of the software.

16. The one or more tangible processor-readable storage media of claim 15, wherein the deferred formula computation request program code associated with the reference is inserted into the software at compile-time, based on encountering the reference to the first programmed formula during compile-time.

17. The one or more tangible processor-readable storage media of claim 15, wherein executing the deferred formula computation request program code determines whether the result of the first programmed formula has been computed during execution of the software.

18. The one or more tangible processor-readable storage media of claim 15, wherein the identifying operation examines the associated dependency graph that indicates components of the first programmed formula, determines that the indicated components are up-to-date, and compute the result of the first programmed formula.

19. The one or more tangible processor-readable storage media of claim 15, wherein the identifying operation examines the associated dependency graph that indicates components of the first programmed formula, determines that one or more of the indicated components are not up-to-date, updates the one or more of the indicated components, and computes the result of the first programmed formula based on the indicated components and on the updating.

20. The one or more tangible processor-readable storage media of claim 19, wherein the indicated components include input data or other programmed formulas.

* * * * *